H. B. STOCKS.
APPARATUS FOR RECORDING SOUNDS PHOTOGRAPHICALLY.
APPLICATION FILED OCT. 7, 1915.

1,252,965.

Patented Jan. 8, 1918.

Witnesses:

Inventor
Harry B. Stocks
by
Attorney

H. B. STOCKS.
APPARATUS FOR RECORDING SOUNDS PHOTOGRAPHICALLY.
APPLICATION FILED OCT. 7, 1915.

1,252,965.

Patented Jan. 8, 1918.
2 SHEETS—SHEET 2.

Witnesses:

Inventor
Harry B. Stocks
by
Attorney

UNITED STATES PATENT OFFICE.

HARRY BENWELL STOCKS, OF NORTHENDEN, ENGLAND.

APPARATUS FOR RECORDING SOUNDS PHOTOGRAPHICALLY.

1,252,965.

Specification of Letters Patent.

Patented Jan. 8, 1918.

Application filed October 7, 1915. Serial No. 54,626.

*To all whom it may concern:*

Be it known that I, HARRY BENWELL STOCKS, a British subject, residing at Northenden, county of Chester, England, have invented certain new and useful Improvements in Apparatus for Recording Sounds Photographically, of which the following is a specification.

This invention relates to recording sounds photographically upon a film strip to be subsequently re-produced by means of light transmitted through the film upon a selenium cell.

The primary object of the invention is to provide apparatus whereby sounds or sound waves are recorded by enlarging or reducing the aperture of a shutter synchronously with an increase or a reduction, respectively, in the intensity of light projected or cast upon a light sensitive film to produce upon such film a record which varies both in width and density.

It consists essentially in the employment in the electric circuit through which the sound is transmitted of a mercury vapor lamp of high actinic power, the internal electric resistance of which and the intensity of the light therefrom are controlled by an electromagnet or solenoid and in the combination therewith of a second magnet or electromotor in the lamp circuit controlling or operating a shutter through which the light passes so that the movements of the shutter synchronize with the increase or decrease of intensity of the light, a greater volume of light being projected through the shutter when the light is intense and a lesser volume of light as the intensity of the light is decreased.

The invention will be fully described with reference to the accompanying drawings.

The apparatus is constructed with a mercury vapor lamp A having an electromagnet B arranged below and with its lines of force directed upwardly toward the negative electrode of the lamp, this electromagnet being energized by a battery C and microphone or other telephone transmitter D. The mercury vapor lamp A is in circuit with a second electromagnet E and battery $e$ and as the internal resistance in the lamp varies inversely with respect to variations in the extent of upward projection of the negative flame of the lamp under the influence of the magnetic field of the magnet B, the power of the magnet E is increased or reduced. As the internal resistance in the mercury vapor lamp A decreases in accordance with an increase in the upward projection of the negative flame of the lamp, the light of the lamp increases in intensity and simultaneously and in synchronism therewith the power of the magnet E also increases. The variations of current in the microphone or telephone circuit cause increased variations in the magnetic field of the magnet B, these variations in the magnetic field of the magnet B in turn causing variations in the extent of upward projection of the negative flame of the lamp, causing, in consequence, variations in the amount and the intensity of the light produced by the lamp. A shutter F constructed of a plate $f$ preferably of V shape moving past a plate $f'$ is operated by the electromagnet E being attracted to and moved toward the magnet when energized against the pressure of a spring $e'$ which moves it in opposite direction. The shutter F is thus opened wider and a greater volume of light is permitted to pass and impinge upon the film at the same time as the intensity of the light of the lamp is increased. The opening in the shutter closes or lessens as the intensity of the light of the lamp decreases, and thus the amount and intensity of the light projected through the shutter F vary at the same time.

Figure 4:
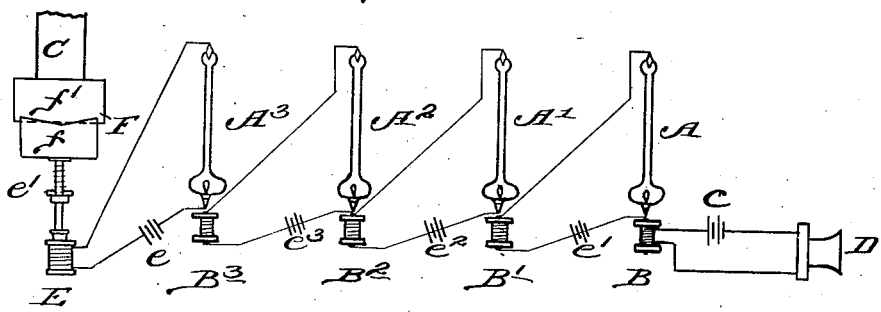
Fig. 4 is a diagrammatic view showing a plurality of lamps arranged in cascade to increase the power acting on the shutter.

The mercury vapor lamp A placed in the circuit renders very sensitive the electric resistance of the circuit and the magnetic intensity of the electromagnet E, in circuit therewith, causing said magnet to operate the shutter F in response to the initial impulse in the circuit at the telephone or microphone transmitter D. Two or more mercury vapor lamps may be arranged in cascade to increase the power acting on the shutter F. Such an arrangement is shown in Fig. 4, wherein four lamps A, A', A² and A³ are employed, these lamps being provided with electromagnets B, B', B² and B³ and batteries e, e', e² and e³.

The electromagnet E instead of being in the circuit with the battery e may be in a secondary circuit energized therefrom.

Figure 1:
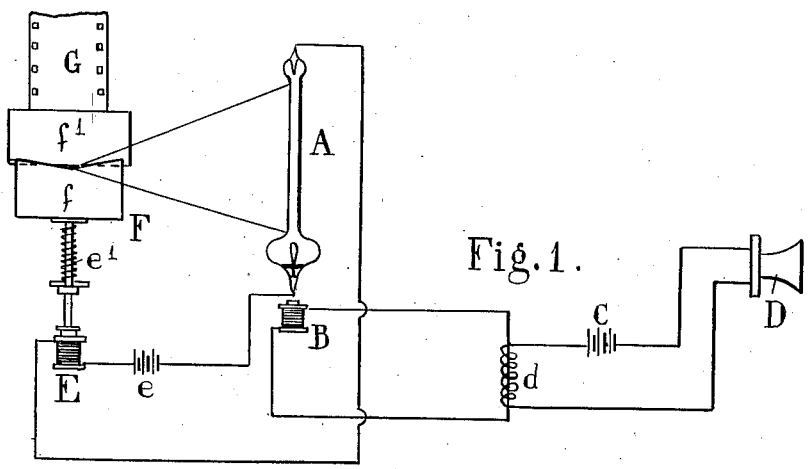
Figure 1 is a diagrammatic view of the improved apparatus for transmitting the sounds to the film record.

The transmitter D may be directly in circuit with the electromagnet B or a transformer coil may be interposed, as at d, Fig. 1.

Figure 2:
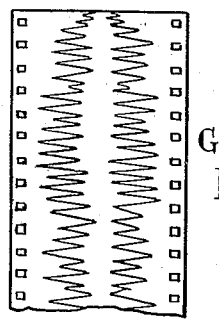
Fig. 2 is a length of film showing the record produced thereon by the apparatus.

The record produced on the film G is represented in the diagram Fig. 2 which can be used as a negative from which to photographically print or reproduce any number of records.

Figure 3:
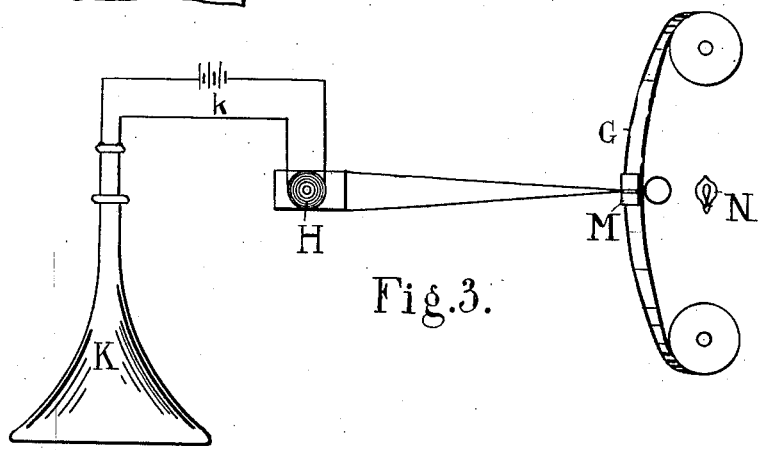
Fig. 3 is a diagrammatic view of apparatus for reproducing the sounds from the photographic film record.

For reproducing the sounds from the film record G apparatus is constructed as shown in Fig. 3 with a selenium cell H in circuit with a telephone receiver K and battery k.

The film record G is passed behind a slotted plate M and in front of an ordinary lamp N of fixed candle power or intensity. As the film is traveled past the slot in the plate, the beams of light from the lamp pass through the film and on to the selenium cell H, the volume and intensity of the light varying respectively with the width of the transparent parts of the film, and the degree of transparency thereof, and thereby causing sounds to be reproduced by the action of the selenium cell H on the receiver K varying in duration and intensity in exact accordance with the sounds originally spoken into the transmitter D of the recording apparatus illustrated in Fig. 1.

Figure 5:
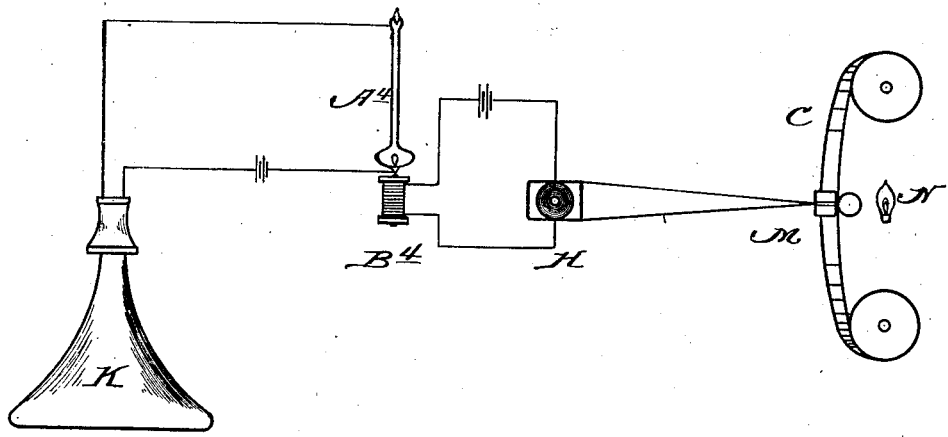
Fig. 5 is a diagrammatic view showing a modification of the arrangement of Fig. 3.

To intensify the sounds reproduced from the sound film record G a mercury vapor lamp or lamps such as A of Fig. 1 controlled by an electromagnet may be introduced into the circuit between the selenium cell H and telephone receiver K shown in Fig. 3. Such an arrangement is shown in Fig. 5, wherein a mercury vapor lamp A⁴ controlled by an electro-magnet B⁴ is introduced into the circuit between the selenium cell H and the telephone receiver K.

The synchronizing of the sound film record G during exhibition with the cinematograph picture film record will be effected by adjusting the speed by which the films are drawn through the exhibiting machines or lanterns. The sound film record G may be produced on a length of film of single width as shown in Fig. 2 or may be produced upon a double width film one half of which will receive the sound record and the other half of which will receive the picture record.

What I claim as my invention and desire to protect by Letters Patent is:—

1. In apparatus for recording sounds photographically, the combination with a microphone circuit, of an electro-magnet having its magnetic power controlled by said circuit, a mercury vapor lamp of high actinic power the electric resistance of which is controlled by said electro-magnet and the intensity of light of which varies in accordance with variations in current flow in the microphone circuit, and a shutter controlled by said lamp to increase the size of its aperture when the intensity of light from the lamp increases and to reduce the size of its aperture when the intensity of such light diminishes.

2. In apparatus for recording sounds photographically, the combination with a microphone circuit, of an electro-magnet in said circuit, a second electric circuit, a mercury vapor lamp in said second circuit and controlled by the electro-magnet of the microphone circuit, an electro-magnet in the lamp circuit, and a shutter operated and controlled by the magnet in the lamp circuit and through which a varying beam of light is projected onto a sensitized film.

3. Apparatus for recording sounds photographically comprising a microphone circuit, a shutter, a photographically sensitive medium to which light is admitted by said shutter, a mercury vapor lamp of high actinic power whose intensity varies with its internal electrical resistance, said lamp being controlled by said microphone circuit, the light from the lamp being projected through the shutter onto the sensitive medium, and means controlled by the lamp for increasing and diminishing the extent of opening of the shutter in accordance with variations in the intensity of light from the lamp.

4. Apparatus for recording sounds photographically comprising a transmitter circuit, a mercury vapor lamp circuit having a magnet therein, and a shutter operated by said magnet to increase and diminish the size of its aperture when the intensity of the light of said lamp increases and diminishes, respectively, the lamp being controlled and its intensity varied by the transmitter circuit.

5. Apparatus for recording sounds photographically upon a film strip comprising a transmitting instrument, an electric battery and circuit, an electro-magnet in the circuit, a mercury vapor lamp controlled by the magnet in the transmitter circuit, an electric battery and circuit for the lamp, an electromotor in the lamp circuit, and a shutter comprising two plates one of which is V-shaped and is operated and controlled by the electro-motor, the shutter providing a slit through which the beam of light from the lamp is projected onto said film strip.

6. The method for producing a sound film record having a record thereon varying both in density and amount which consists in varying the internal resistance and consequently the intensity of the light produced by a mercury vapor lamp in accordance with corresponding variations of sound waves, and producing a photographic record of the variations of intensity and of the amount of light produced by the lamp.

In testimony whereof I have hereunto set my hand in presence of two subscribing witnesses.

HARRY BENWELL STOCKS.

Witnesses:
  J. OWDEN O'BRIEN,
  GEO. H. O'BRIEN.